United States Patent [19]

Takeuchi et al.

[11] Patent Number: 4,856,919

[45] Date of Patent: Aug. 15, 1989

[54] PEN PRINTER

[75] Inventors: Hiroshi Takeuchi, Kanagawa; Daiju Kohga; Yasuo Yukita, both of Tokyo, all of Japan

[73] Assignee: Sony Corporation, Tokyo, Japan

[21] Appl. No.: 917,470

[22] Filed: Oct. 10, 1986

[30] Foreign Application Priority Data

Nov. 5, 1985 [JP] Japan .................................. 60-247320

[51] Int. Cl.⁴ ............................................. B41J 29/26
[52] U.S. Cl. ...................................... 400/18; 400/125; 101/327
[58] Field of Search ...................... 400/124, 125, 125.1, 400/18; 101/327

[56] References Cited

U.S. PATENT DOCUMENTS

| | | | |
|---|---|---|---|
| 3,967,714 | 7/1976 | Potma et al. | 400/125.1 |
| 4,517,576 | 5/1985 | Sugawara | 346/139 R |
| 4,579,468 | 4/1986 | Gomi et al. | 400/124 |

FOREIGN PATENT DOCUMENTS

| | | | |
|---|---|---|---|
| 139508 | 5/1985 | European Pat. Off. | 400/124 |
| 0117275 | 3/1987 | European Pat. Off. | |
| 2806266 | 8/1979 | Fed. Rep. of Germany | |
| 86772 | 7/1981 | Japan | 400/124 |
| 12688 | 1/1982 | Japan | 400/124 |
| 12863 | 1/1984 | Japan | 400/124 |
| 81180 | 5/1984 | Japan | 400/124 |
| 60-109845 | 6/1985 | Japan | |
| 210464 | 10/1985 | Japan | 400/124 |
| 1410190 | 10/1975 | United Kingdom | 400/125.1 |

OTHER PUBLICATIONS

IBM Tech. Disc. Bulletin, "Self Contained Inking and Print Wire", Nowselski, vol. 23, No. 4, Sep. 1980, pp. 1347-1350.
Patent Abstracts of Japan, vol. 9, No. 264 (M-423) 1987, Oct. 22, 1985.

*Primary Examiner*—Edgar S. Burr
*Assistant Examiner*—James R. McDaniel
*Attorney, Agent, or Firm*—Ronald P. Kananen

[57] ABSTRACT

A pen printer for converting data into printed form on a print sheet placed on a platen. The pen printer comprises a plurality of ink pens and a pen carriage mounted for reciprocating movement above the platen. The pen carriage has a device for removably attaching each of the ink pens juxtaposed in the direction of movement of the carriage. Pen actuators are mounted on the pen carriage apart from the ink pens with each pen actuator being responsive to an electrical signal for bringing a corresponding one of the ink pens toward the platen into contact with the print sheet. The pen printer also comprises a carriage actuator responsive to an electrical signal for moving the pen carriage and a sheet feed mechanism responsive to arrival of the pen carriage to at least one of first and second predetermined positions separated from each other for feeding the print sheet a predetermined length on the platen. A control circuit is provided for converting the data into electrical signals to control the pen actuators and the carriage actuator.

8 Claims, 20 Drawing Sheets

PEN PRINTER

BACKGROUND OF THE INVENTION

This invention relates to a pen printer for converting data into printed form on a print sheet.

It has been proposed to convert data into printed form on a print sheet by employing a pen printer such, for example, as is disclosed in Japanese Patent Kokai No. 60-109845. As described therein, the pen printer includes a plurality of ink pens mounted as a unit on a pen carriage for printing figures with different colors. Each of the ink pens includes a pen tip secured on one end of a cantilever leaf spring and a pen actuator. The pen actuator includes a solenoid and a plunger coupled to the leaf spring for bringing the pen tip into pressure contact with the print sheet placed on a platen when the solenoid is energized. During a printing operation, the data are converted into electrical drive signals which are applied to cause the pen actuators to bring the respective pen tips selectively into pressure contact with the print sheet while reciprocating the pen carriage along the platen.

One problem in the prior art results from the fact that the pen actuators are positioned between the respective ink pens and the platen. This structure results in a severe limitation on the freedom of design of the path of the print sheet. Another problem in the prior art results from the fact that a plurality of ink pens are combined integrally in spite of the fact that the ink consumption is different from one color from another. This structure results in an economic penalty when the ink pens are thrown away due to ink shortage even though ink remains in some of the ink pens.

SUMMARY OF THE INVENTION

There is provided, in accordance with the printed form on a print sheet placed on a platen. The pen printer comprises a plurality of ink pens, and a pen carriage mounted for reciprocating movement above the platen. The pen carriage has means for removably attaching each of the ink pens juxtaposed in the direction of movement of the carriage. Pen actuators are mounted on the pen carriage apart from the ink pens with each pen actuator being responsive to an electrical drive signal for bringing a corresponding one of the ink pens toward the platen into contact with the print sheet. The pen printer also comprises a carriage actuator responsive to an electrical drive signal for moving the pen carriage and a sheet feed mechanism responsive to arrival of the pen carriage to at least one of first and second predetermined positions separated from each other for feeding the print sheet a predetermined length on the platen. A control circuit is provided for converting the data into electrical drive signals to control the pen actuators and the carriage actuator.

Therefore, the invention provide an improved pen printer which can eliminate the problems which occur in the prior art pen printers. The pen actuators are positioned apart from the respective ink pens to permit separate replacement of the ink pens apart from the pen actuators. In addition, each of the ink pens is removably attached on the pen carriage to permit separate replacement of one ink pen away from the other.

BRIEF DESCRIPTION OF THE DRAWINGS

The present invention will be described in greater detail by reference to the following description taken in connection with the accompanying drawings, in which.

DETAILED DESCRIPTION OF THE INVENTION

Figure 1:
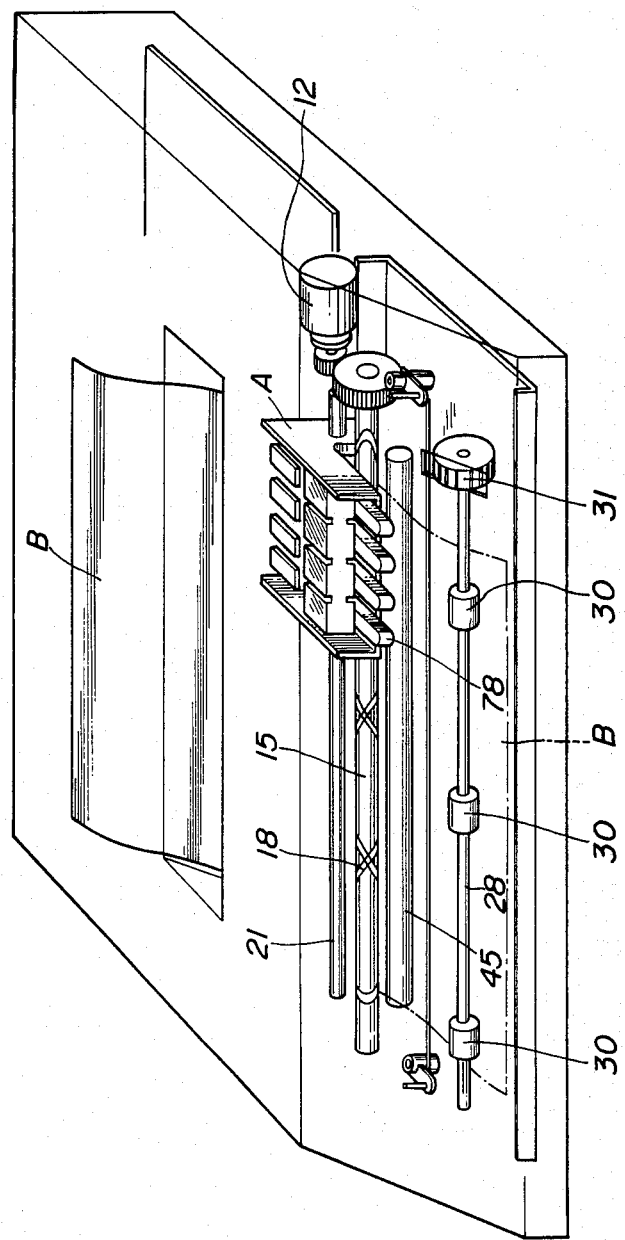
FIG. 1 is a schematic perspective view of a pen printer embodying the invention.

With reference to the drawings, wherein like numerals refer to like parts in the several views, and in particular to FIG. 1, there is a schematic illustration of pen printer embodying the apparatus of the invention. The pen printer is shown as including a printer head A for printing figures or characters with different colors on a print paper sheet B fed onto a platen roller 45 while it reciprocates on a guide rod 21. The printer head A returns to the right when it arrives at a predetermined left position and returns to the left when it arrives at a predetermined right position. For this purpose, the printer head A has a cam follower held in engagement with an endless spiral cam groove 18 which is formed in a head feed screw 15 in a manner to permit reciprocating movement of the printer head between the predetermined left and right positions. A sheet feed mechanism feeds the print paper sheet B a predetermined length on the platen roller in response to arrival of the printer head A at the predetermined right or left position.

Figure 2:
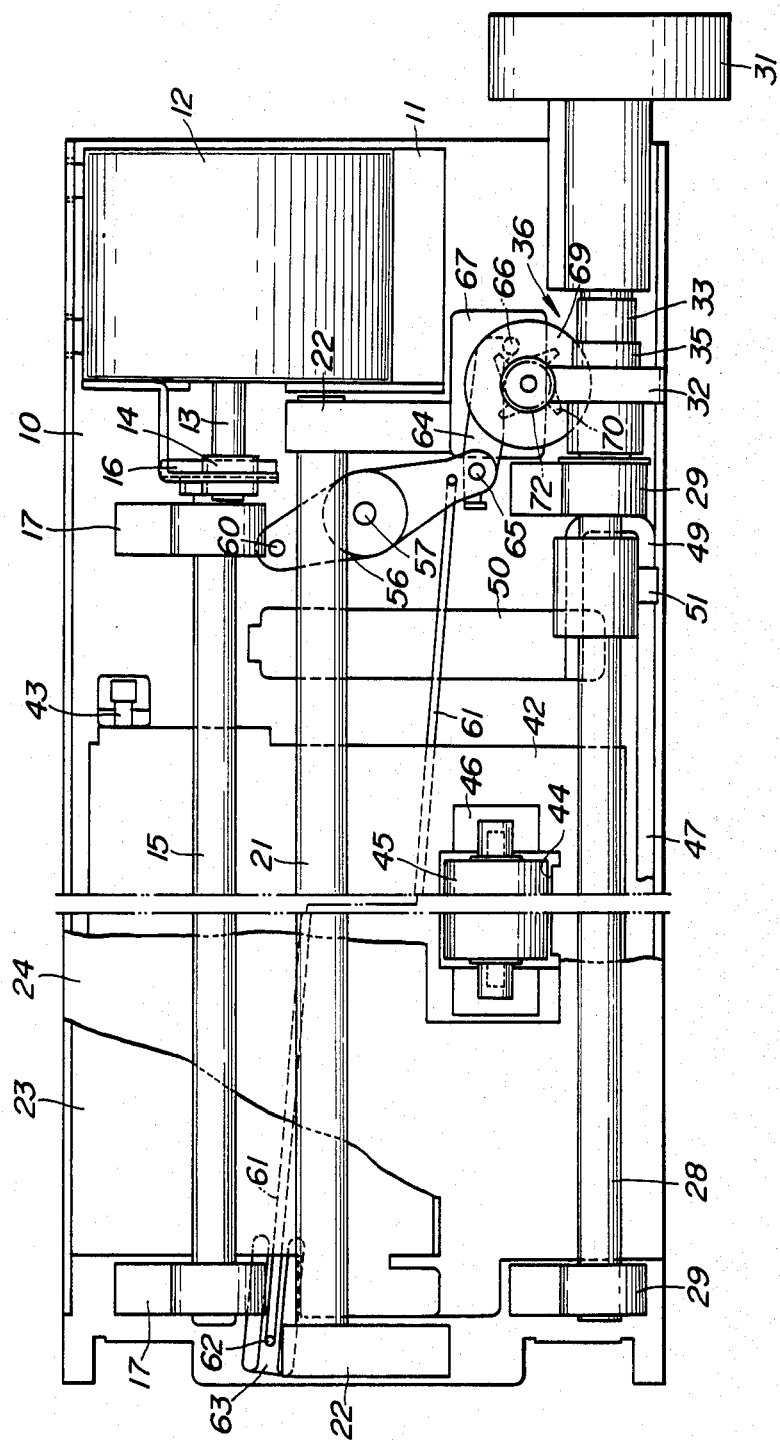
FIG. 2 is a fragmentary plan view of the pen printer.
Figure 3:
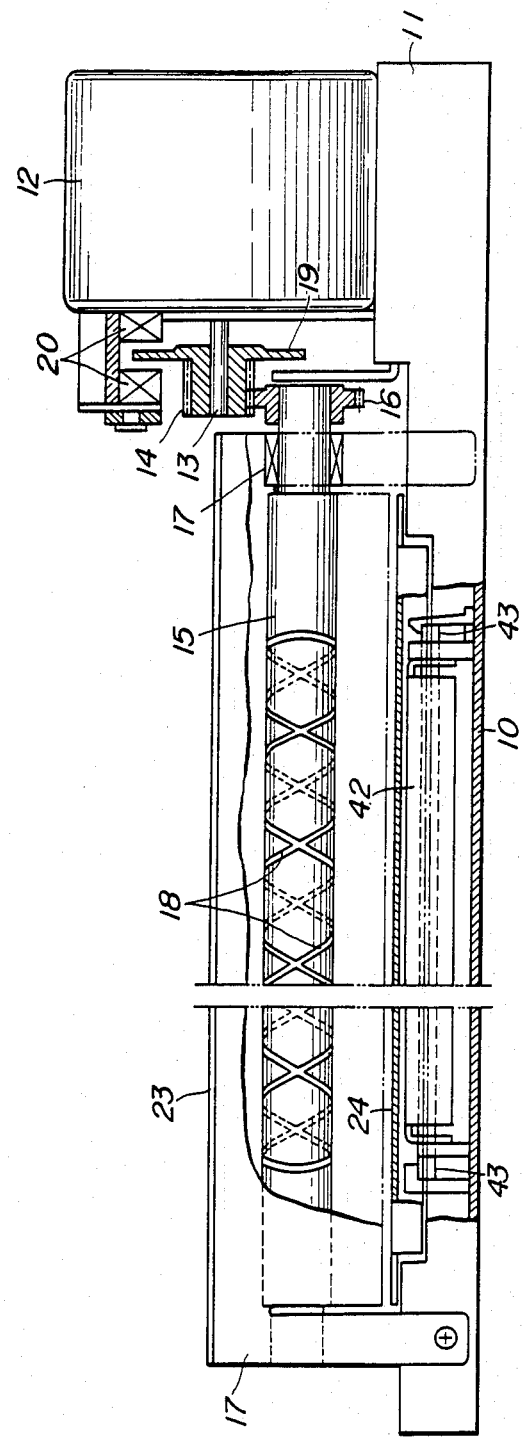
FIG. 3 is a fragmentary sectional view showing the head feed screw used in the pen printer.
Figure 4:
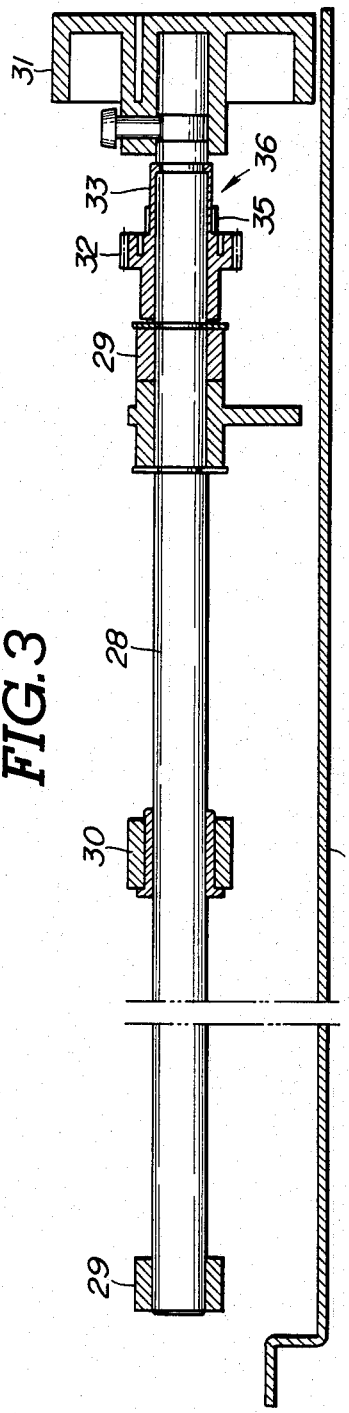
FIG. 4 is a fragmentary sectional view showing the sheet feed roller used in the pen printer.

Referring to FIGS. 2 to 4, the electric motor 12 is mounted on a mounting platform 11 provided on a chassis 10. The electric motor 12 has an output shaft 13 having a disc plate 19 secured thereon. An encoder or transducer 20 contains a pair of electrical coils arranged in spaced relation to each other so that the disc plate 19 can rotate between the electrical coils to cause the encoder 20 to produce a voltage signal corresponding to the frequency of rotation of the disc plate 19 and thus the electric motor 12. The electric motor output shaft 13 also has a drive gear 14 secured thereon. The drive gear 14 is in mesh engagement with a driven gear 16 secured on one end of the head feed screw 15. The head feed screw 15 is rotatably supported at its opposite ends through respective bearings 17 on the chassis 10. The head feed screw 15 is provided in its circumferential surface with two spiral grooves. The spiral grooves are positioned to extend transversely relative to each other and connected by circular end grooves in a manner to form a single continuous cam groove 18.

A guide rod 21 is secured at its opposite ends through respective bearings 22 on the chassis 10 in a manner to extend in parallel with the head feed screw 15. As shown in FIG. 1, the printer head A is mounted for reciprocating movement on the guide rod 21 between the leftmost and rightmost positions thereof. The printer head A has a cam follower held in engagement with the cam groove 18 for reciprocating movement on the guide rod 21 with rotation of the head feed screw 15. A roller shaft 28 is secured rotatably at its opposite ends through respective bearings 29 on the chassis 10 in a manner to extend in parallel with the head feed screw 15. The roller shaft 28 has a plurality of sheet feed rollers 30 secured for rotation together with the roller shaft 28. The roller shaft 28 has a worm gear 32 secured thereon at its one end. The worm gear 32 is drivingly connected to an actuating knob 31 through a torque limiting mechanism 36 which limits the torque transmitted from the actuating knob 31 to the worm gear 32 below a predetermined level. The roller shaft 28 is also connected drivingly with an intermittent drive mechanism which rotates the roller shaft 28 intermittently in response to arrival of the printer head A at its rightmost and leftmost positions.

Figure 5:
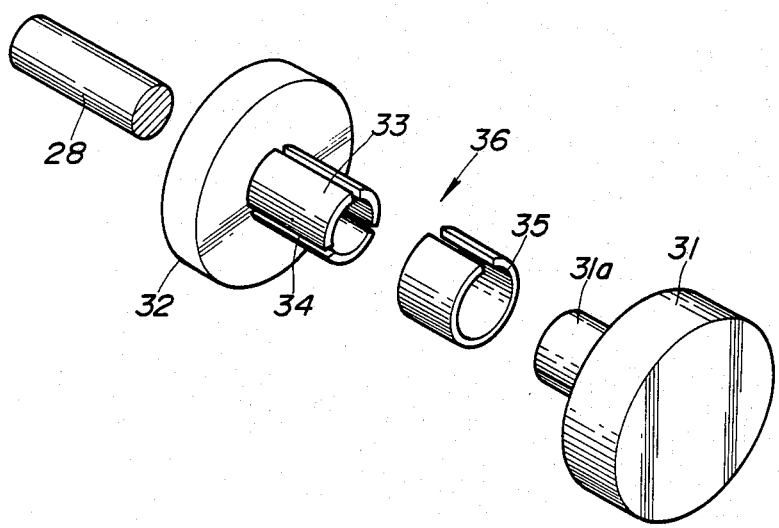
FIG. 5 is an exploded perspective view of the torque limiting mechanism provided on the roller shaft.
Figure 6:
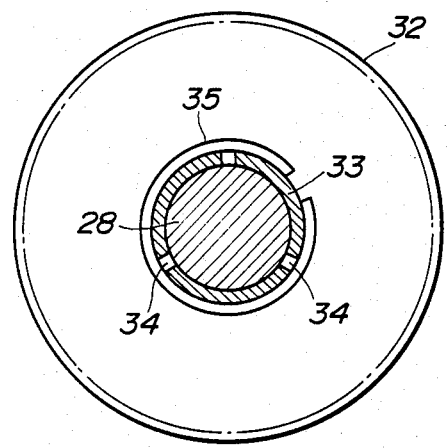
FIG. 6 is a sectional view of the torque limiting mechanism.

Referring to FIGS. 5 and 6, the torque limiting mechanism 36 includes a slitted sleeve 33 formed integrally on one side of the worm gear 32 and coaxially with the roller shaft 28. The sleeve 33 is formed with a plurality of slits extending the full length thereof. The actuating knob 31 has a boss 31a which receives the roller shaft 28 tightly. A ring spring 35 is mounted on the slitted sleeve 33 to apply a frictional force so as to provide a frictional connection between the slitted sleeve 33 and the roller shaft 28. This mechanism permits an operator to manually rotate the roller shaft 28 so as to advance or retard a print paper sheet placed on the platen roller 45. If the torque transmitted from the actuation knob 31 to the slitted sleeve 33 exceeds a level determined by the resilient force of the ring spring 35, slippage will occur between the actuation knob shaft 31a and the slitted sleeve 33. This is effective to avoid breakage of the driving mechanism associated with the roller shaft 28 upon feeding paper manually.

Figure 7:
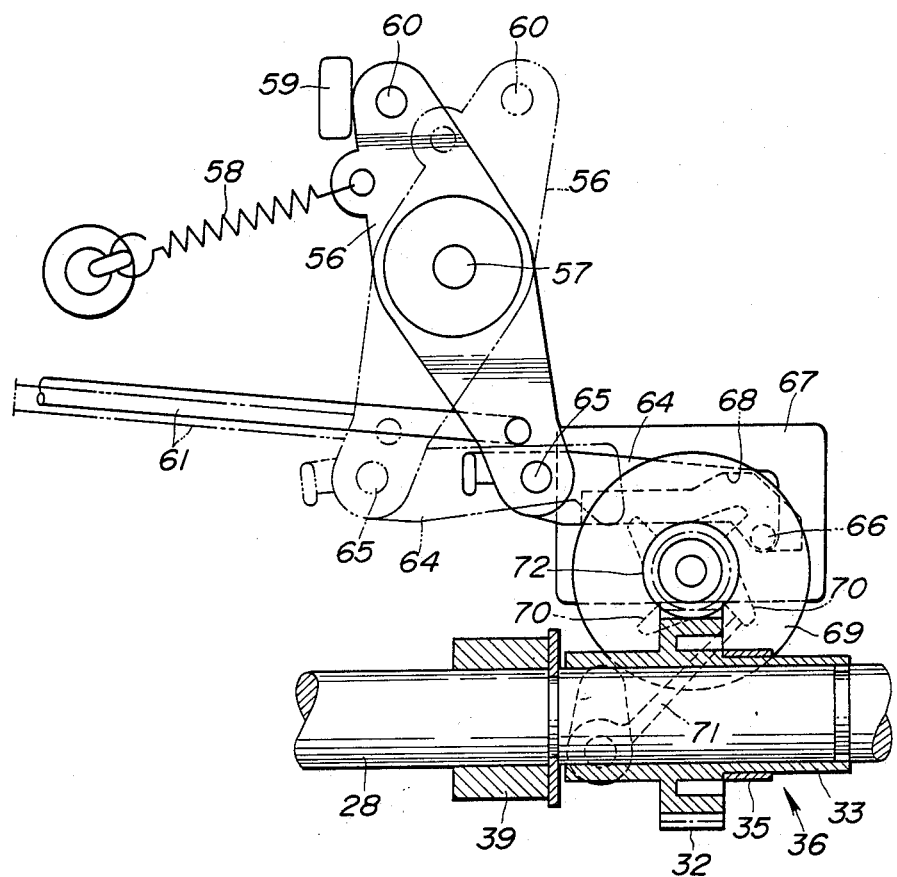
FIG. 7 is a plan view partly in section of the sheet feed mechanism used in the pen printer.
Figure 8:
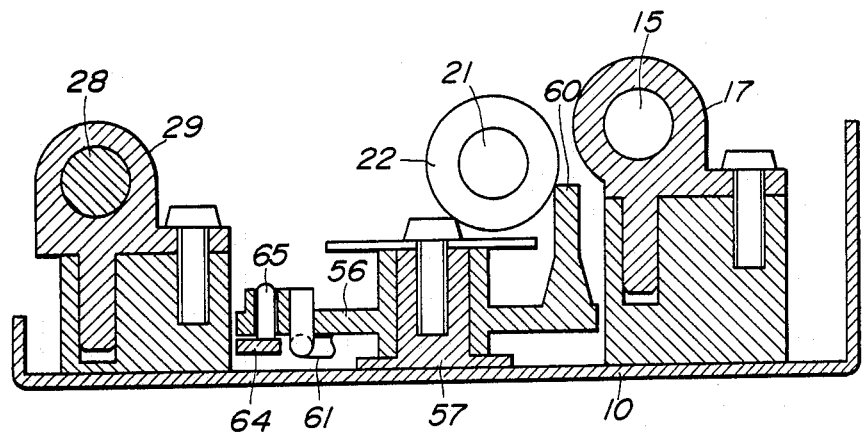
FIG. 8 is a sectional view showing the drive lever used in the sheet feed mechanism.
Figure 9:
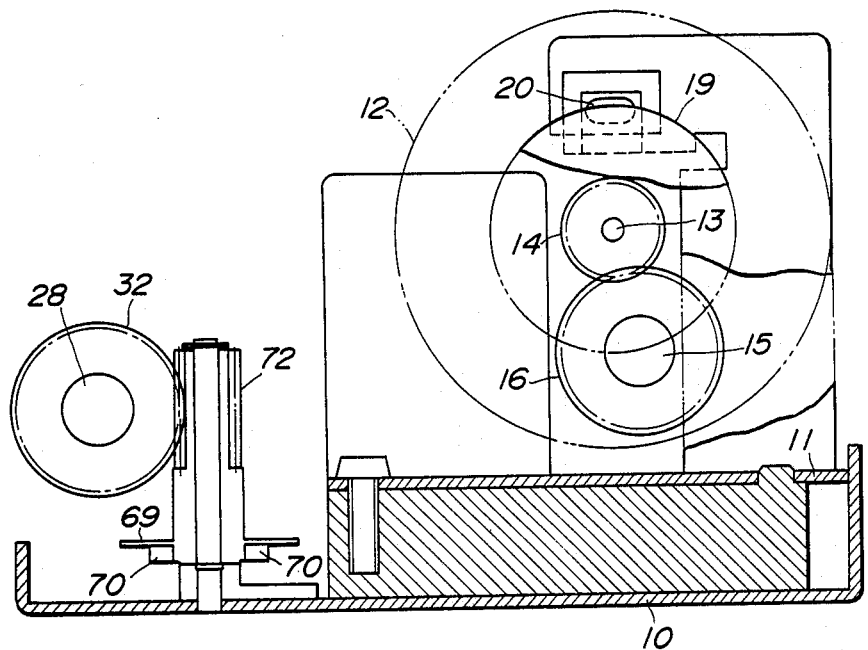
FIG. 9 is a sectional view showing the torque transmission device used in the sheet feed mechanism.

Referring to FIGS. 7 to 9, the intermittent drive mechanism includes a worm 72 which is in mesh engagement with the worm gear 32 coupled to the roller shaft 28. The worm 72 is provided on one end of a drive shaft mounted on the chassis 10 for rotation about its axis. The worm 72 has a drive wheel 69 secured thereon. The drive wheel 69 is provided on its one side with four sprocket pawls 70 located 90 degrees apart from one another. The drive wheel 69 is urged in a clockwise direction, as viewed in FIG. 7, by a suitable resilient means (not shown). A stopper 71 is in abutment with one of the sprocket pawls 70 so as to prevent rotation of the drive wheel 69 in the clockwise direction while allowing rotation of the drive wheel 69 in the counter-clockwise direction.

A print sheet feed lever 56 has its center pivoted at 57 on the chassis 10. The feed lever 56 is provided at its one end with a drive pin 60 at a position near the guide rod 21 for abutment with the printer head. A compression spring 58 is provided to urge the lever 56 into abutment with a stopper 59. The feed lever 56 is also provided at the other end thereof with a drive lever 64 pivoted at 65 on the feed lever 56. The drive lever 64 has a cam follower pin 66 for abutment with one of the sprocket pawls 70. The cam follower pin 66 is held in engagement with a guide groove 68 which is formed in a cam plate 67 secured on the chassis 10. A drive rod 61 is pivoted at its one end on the feed lever 56 near the pivot 65. The rod 61 terminates in a turned end 62 which is guided by a guide 63 (FIG. 2).

When the printer head A comes to its rightmost position on the guide rod 21, it pushes the pin 60 to rotate the feed lever 56 about the pivot 57 in the clockwise direction, as viewed in FIG. 7, from its full line position to its dotted line position against the resilient force of the compression spring 58. This clockwise rotation of the feed lever 56 causes the drive lever 64 to move to the left, as viewed in FIG. 7, from its full line position to its dotted line position. During this movement, the cam follower pin 66 moves along the cam groove 68 to push one of the sprocket pawls 70 so as to rotate the drive wheel 69 at 90 degrees in the counter-clockwise direction, as viewed in FIG. 7. After the drive wheel 69 rotates at 90 degrees, another sprocket pawl 70 comes into abutment with the stopper 71 which prevents rotation of the drive wheel 69 in the clockwise direction. The counter-clockwise rotation of the drive wheel 69 is transmitted through the worm 72 and the worm gear 32 to the roller shaft 28, causing the sheet feed rollers 30 to advance the print paper sheet a predetermined length corresponding to the 90 degrees of rotation of the drive wheel 69 under a frictional force between the feed rollers 30 at the platen roller 45.

When the printer head A moves to the left from the rightmost position, it leaves from the pin 60 to permit the feed lever 56 to rotate in the counter-clockwise direction, as viewed in FIG. 7, from the dotted line position to the full line position under the resilient force of the compression spring 58. During $ this rotation of the feed lever 56, the cam follower pin 66 moves over the sprocket pawls 70 to its initial position along the guide groove 68. The stopper 71 is in abutment with one of the sprocket pawls 70 to prevent rotation of the clockwise rotation of the drive wheel 69.

When the printer head A comes to its leftmost position, it pushes the turned end 62 of the rod 61 in a direction rotating the feed lever 56 about the pivot 57 in the clockwise direction, as viewed in FIG. 7, from its full line position to its dotted line position against the resilient force of the compression spring 58. This clockwise direction of the feed lever 56 causes the drive lever 64 to move to the left, as viewed in FIG. 7, from its full line position to its dotted line position. During this movement, the cam follower pin 66 moves along the cam groove 68 to push one of the sprocket pawls 70 so as to rotate the drive wheel 69 at 90 degrees in the counter-clockwise direction, as viewed in FIG. 7. After the drive wheel 69 rotates at 90 degrees, another sprocket pawl 70 comes into abutment with the stopper 71 which prevents rotation of the drive wheel 69 in the clockwise direction. The counter-clockwise rotation of the drive wheel 69 is transmitted through the worm 72 and the worm gear 32 to the roller shaft 28, causing the sheet feed rollers 30 to advance the print paper sheet by the predetermined length under a frictional force between the feed rollers 30 and the palten roller 45.

When the printer head A moves to the right from the leftmost position, it leaves from the rod turned end 62 to permit the feed lever 56 to rotate in the counter-clockwise direction, as viewed in FIG. 7, from the dotted line position to the full line position under the resilient force of the compression spring 58. During this rotation of the feed lever 56, the cam follower pin 66 moves over the sprocket pawls 70 to its initial position along the guide groove 68. The stopper 71 is in abutment with one of the sprocket pawls 70 to prevent of the clockwise rotation of the drive wheel 69.

Figure 10:
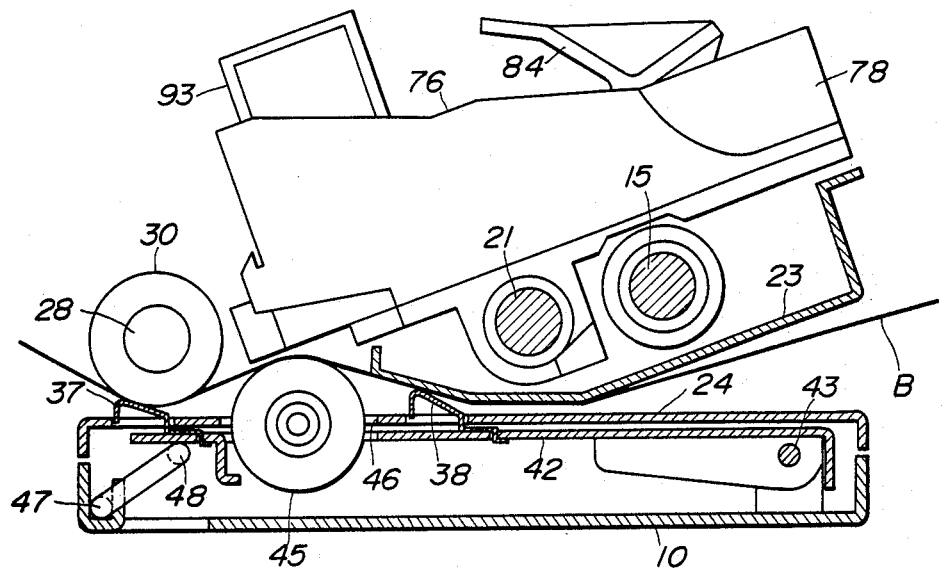
FIG. 10 is a fragmentary longitudinal sectional view of the pen printer.
Figure 11:
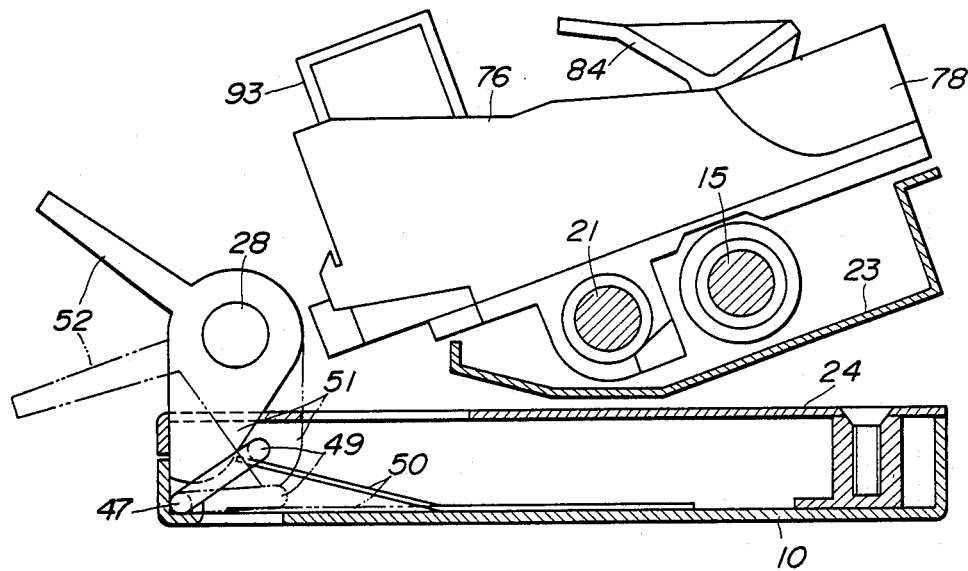
FIG. 11 is a fragmentary longitudinal sectional view of the pen printer.
Figure 12:
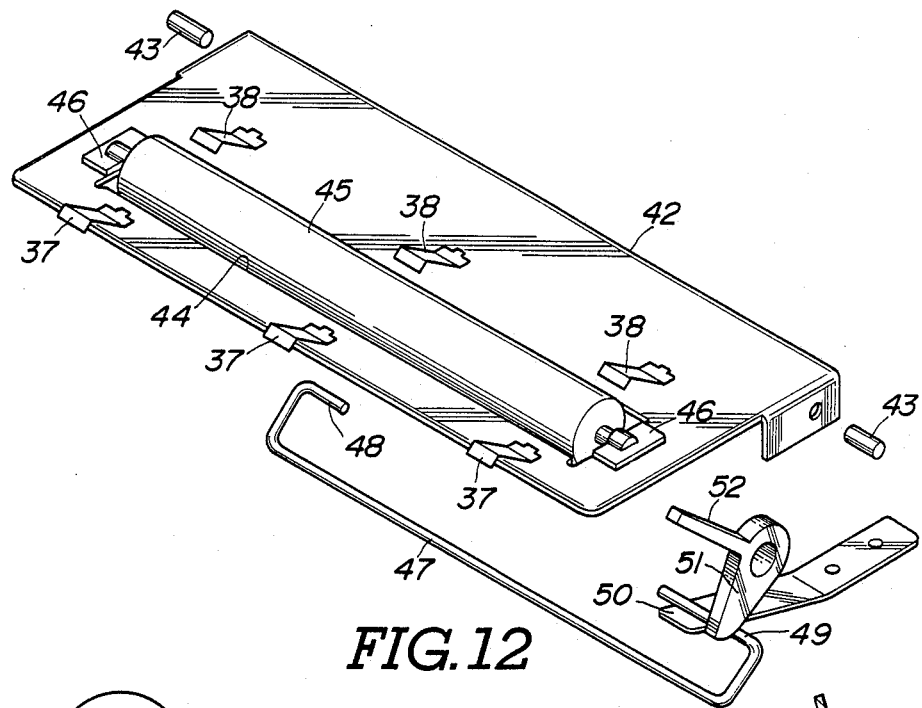
FIG. 12 is a perspective view showing the platen roller support mechanism used in the pen printer.

Referring to FIGS. 10 to 12, the reference numeral 23 designates a sheet guide plate provided below the head feed screw 15 and the guide rod 21. The sheet guide plate 23 defines a sheet guide path together with a table 24 located below the sheet guide plate 23. A support plate 42 is pivoted at 43 on the chassis 10 for rotation below the table 24. The support plate 42 is formed with a rectangular opening 44 and has bearings 46 secured on the opposite sides of the rectangular opening 44. The platen roller 45 has a roller shaft which is supported at its opposite ends on the support plate 42 through the respective bearings 46 so that the platen roller 45 can rotate within the opening 44. The support plate 42 has a plurality of first resilient members 37 arranged in spaced relation along one side of the rectangular opening 44 and a plurality of second resilient members 38 arranged in spaced relation along the other side of the rectangular opening 44. The table 24 is formed therein with a rectangular opening 46 at a position corresponding to the rectangular opening 44 of the support plate 42, with first rectangular openings at positions corresponding to the respective first resilient members 37, and with second rectangular openings at positions corresponding to the respective second resilient members 38.

Figure 13:
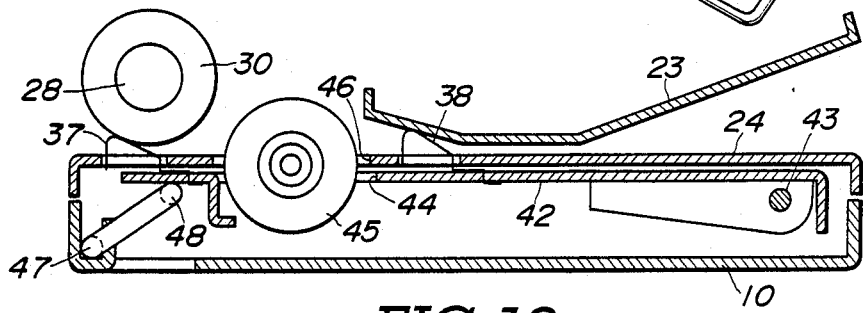
FIG. 13 is a sectional view showing the platen roller at its elevated position.

A leaf spring 50 is secured on the chassis 10 to urge the support plate 42 to its elevated position, as shown in FIG. 13, through a drive rod 47 rotatably mounted on the chassis 10. The drive rod 47 has a turned portion 48 at its one end and another turned portion 49 at the other end thereof. The turned portion 49 is placed on the leaf spring 50 and the turned portion 48 is in abutment on the support plate 42 at a position substantially intermediate between the opposite ends therof to retain the support plate 42 in the elevated position. In the elevated position, the platen roller 45 is in the rectangular opening 46, the first resilient members 37 extend through the respective first rectangular openings into resilient abutment on the respective shaft feed rollers 30, and the second resilient members 38 extend through the respective second rectangular openings into resilient abutment with the sheet guide plate 23.

Figure 14:
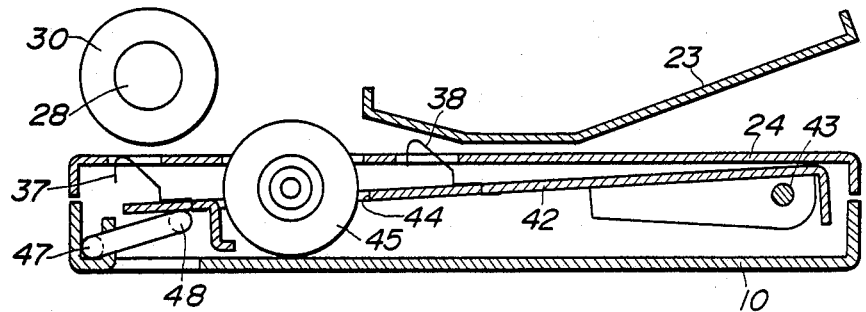
FIG. 14 is a sectional view showing the platen roller at its lowered position.

A cam member 51 is supported rotatably on the roller shaft 28 in contact with the drive rod turned portion 49. The cam member 51 has an actuating lever 52. When the actuating lever 52 is pushed downward, the cam member 51 pushes the rod turned portion 49 downward against the resilient force of the leaf spring 50, allowing the support plate 42 to rotate downward by its weight to its lowered position, as shown in FIG. 14. In the lowered position, the first resilient members 37 out of engagement with the respective feed rollers and the second resilient members 38 come out of engagement with the sheet guide plate 23 to allow insertion of a print paper sheet into the path of travelling of the print paper sheet.

Figure 15:
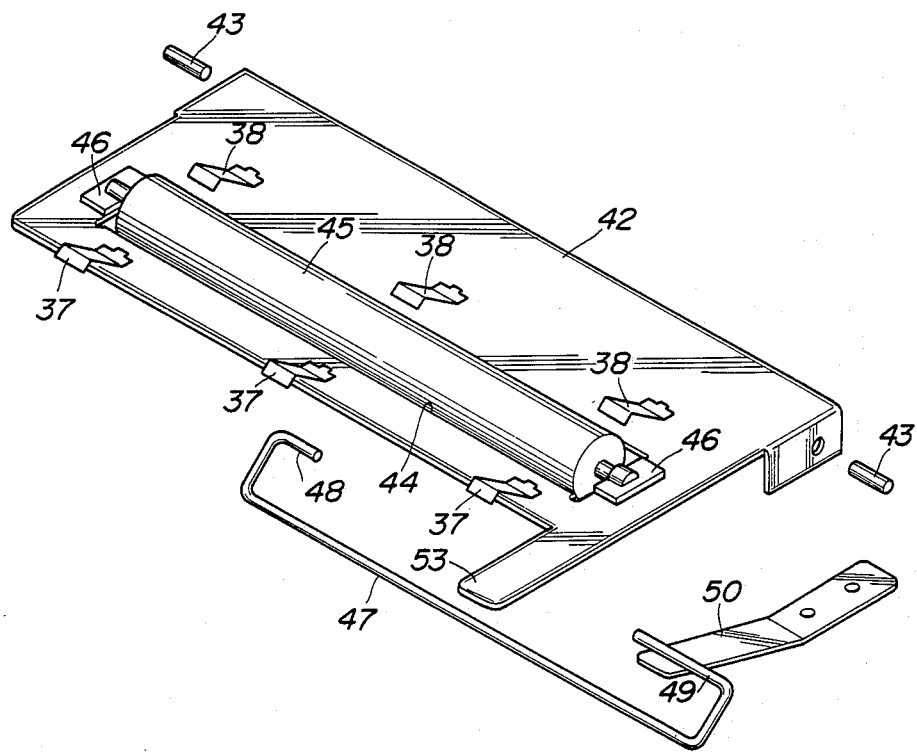
FIG. 15 is a perspective view showing a modified form of the platen roller support mechanism.
Figure 16:
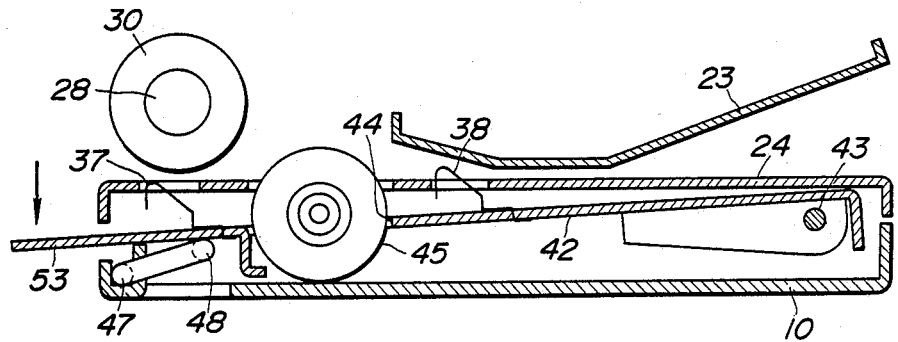
FIG. 16 is a sectional view showing the platen roller at its lowered position in the modification of FIG. 15.

Referring to FIGS. 15 and 16, there is illustrated a modified form of the platen roller support mechanism which is different from the structure of FIGS. 10 to 14 only in that the cam member 51 is removed and replaced by an actuating extension 53 which projects forward from the front edge of the support plate 42. When the actuating extension 53 is depressed downward, the support plate 42 rotates downward about the pivots 43 to the lowered position, as shown in FIG. 16. In the lowered, position, the first resilient members 37 come out of engagement with the respective feed rollers 30 and the second resilient members 38 come out of engagement with the sheet guide plate 23 so that a print paper sheet can be inserted into the sheet travelling path.

Referring to FIGS. 17 to 20, the printer head A comprises a carriage 76 formed of a synthetic resin. The carriage 76 is supported on the guide rod 21 with its cam follower being held in engagement with the cam groove 18 formed in the circumferential surface of the head feed screw 15. The carriage 76 reciprocates on the guide rod 21 with rotation of the head feed screw 15. The head carriage 76 has a plurality (four in the illustrated case) of cartridge attachment sections 77 for releasable attachment of four ink cartridges 78, respectively. The carriage 76 has leaf springs 92 bolted on the front surface thereof to push the ink cartridges 78 rearward. The carriage 76 also has a portion for placement of plunger solenoids 93.

Each of the ink cartridges 78 has an ink tank 79 closed by an adjust block 80. The four ink tanks 79 contain different inks such for example as yellow, magenta, cyan and black inks, respectively. The adjust block 80 has a structure effective to absorb a pressure increase in the ink tank 79 due to an temperature increase. A pen tip 83 is mounted through a leaf spring 82 to the ink cartridge 78. The pen tip 83 has a supply of ink through an ink feed tube 81 which extends through the adjust block 80 into the ink tank 79. A lock lever 84 is releasably secured on the top surface of the carriage 76 to secure the ink cartridge 78 on the corresponding cartridge attachment section 77. The lock lever 84 has a base portion and a lever portion extending forward and upward from the base portion. The base portion is provided with a hook 89 for engagement with a shoulder 91 formed on the top surface of the ink cartridge 78 to lock the ink cartridge 78 from rearward movement. The lock lever base portion is formed in its bottom surface with a cutout 85 to provide a thin portion effective to increase the resilience of the lock lever 84. A counter leaf spring 86 is placed between the lock lever base and lever portions to urge the lock lever in a clockwise direction, as viewed in FIG. 17. A junk plate 87 is bolted on the carriage 76 to press the counter leaf spring 86, together with the hook lever base portion, against the carriage 76. The solenoid plunger 93 is positioned just above the leaf spring 82. The plunger solenoid 93 extrudes its plunger to push or deform the leaf spring 82 which thereby brings the pen tip 83 into pressure contact with the print paper sheet placed on the platen roller 45. The solenoid plunger terminates in a pusher 99.

Referring to FIGS. 21 to 24, the leaf spring 82 is formed at its center with a tent-shaped projection 97 such as by drawing. This structure is effective to permit the solenoid plunger pusher 99 to come into abutment with the leaf spring 82 at a fixed position in spite of deformation of the leaf spring 82 and also to prevent the pen tip 83 from slanting when the solenoid plunger 98 deviates widthwise relative to the leaf srping 82 from a correct position.

Figure 25:
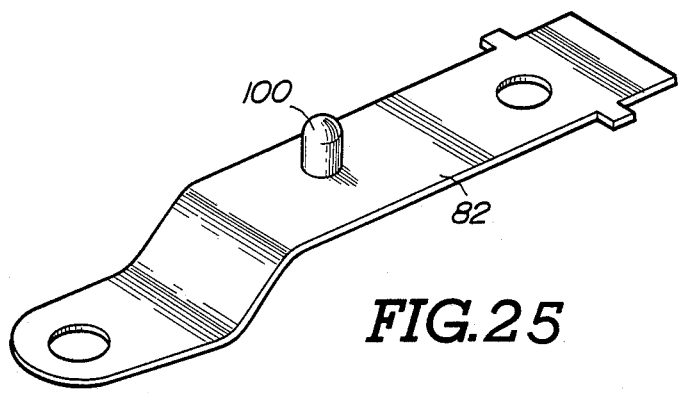
FIG. 25 is a perspective view showing a modified form of the leaf spring.
Figure 26:
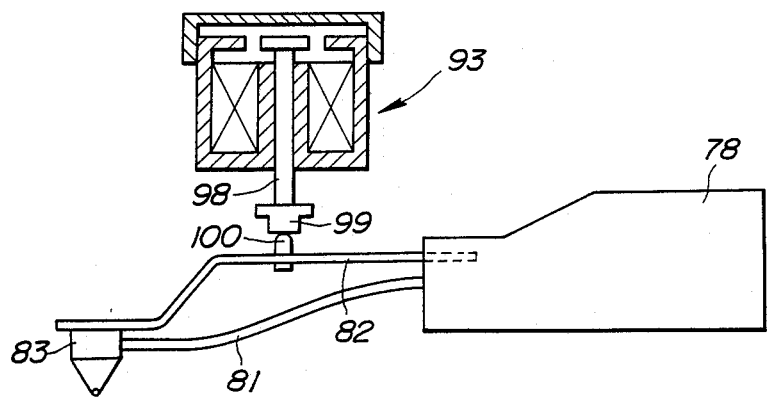
FIG. 26 is a side view partly in section showing the pen actuator with its plunger being in abutment of the modified form of the leaf spring.
Figure 27:
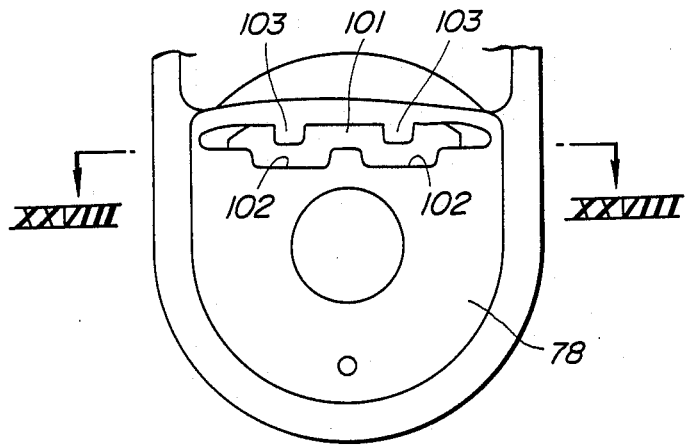
FIG. 27 is a front view of the ink tank.
Figure 28:
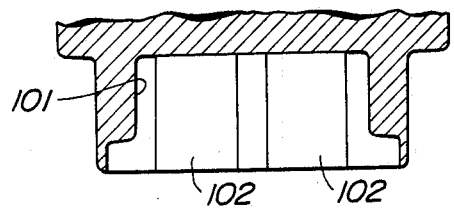
FIG. 28 is a section taken along the line XXVIII—XXVIII of FIG. 27.
Figure 29:
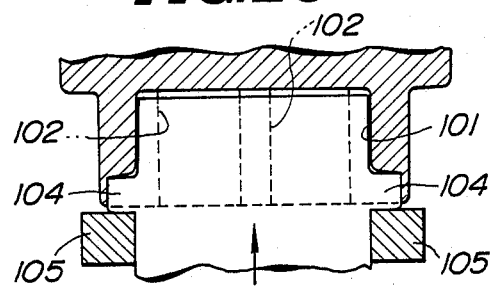
FIGS. 29 and 30 are sectional views used in explaining attachment of of leaf spring.
Figure 30:
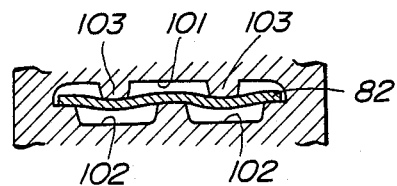

Referring to FIGS. 25 and 26, there is illustrated a modified form of the leaf spring which comprises a leaf spring 82 provided on its top surface with a pin 100. This structure is also effective to permit the solenoid plunger pusher 99 to come into abutment with the leaf spring 82 at a fixed position in spite of deformation of the leaf spring 82 and to prevent the pen tip 83 from slanting when the solenoid plunger 98 deviates widthwise relative to the leaf spring 82 from a correct position.

Referring to FIGS. 27 to 30, the manner in which the leaf spring 82 is secured to the ink cartridge 78 will be described. The ink cartridge 78 is formed with a corrugated slit 101 which has two grooves 102 formed in space relation and two projections 103 extending toward the respective grooves 102. The leaf spring 82 has projections 104 extending from the opposite side edges of the leaf spring 82 adjacent to its root portion. A tool 105 is used to insert the leaf spring root portion into the corrugated slit 101 while pushing the projections 104. When the leaf spring root portion is inserted into the corrugated slit 101, it is corrugated and secured therein certainly to the ink cartridge 78.

Figure 31:
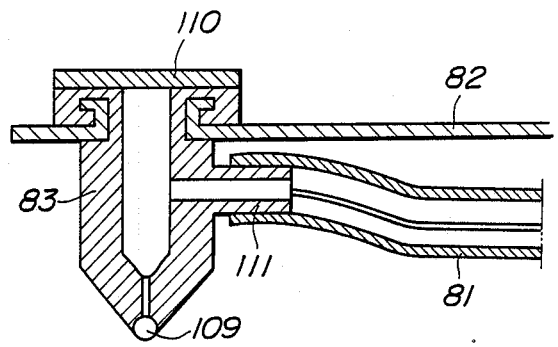
FIG. 31 is a sectional view of the pen tip.
Figure 32:
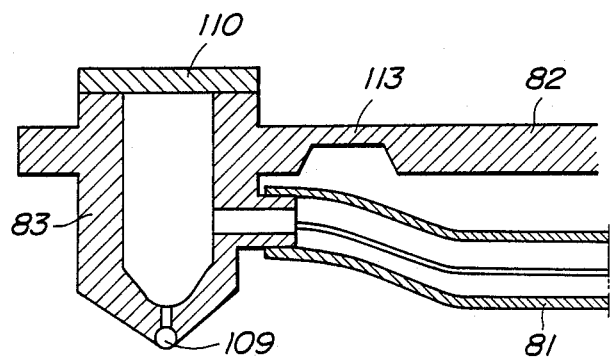
FIG. 32 is a sectional view showing a modified form of the pen tip.
Figure 33:
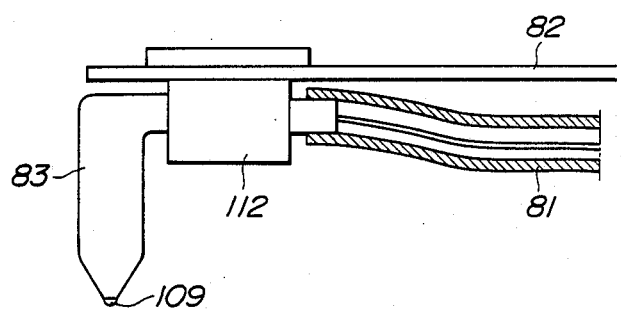
FIG. 33 is a side view partly in section showing another modified form of the pen tip.

Referring to FIGS. 31 to 33, the pen tip 83 is provided at its tip end with a ball 109 on which ink is supplied from the ink feed tube 81. A cap 110, which is provided on the top of the pen tip 83, serves as a damper which comes into abutment with a stopper (not shown) to minimize resonance when the leaf spring 82 returns to its initial position. This structure is effective to stabilize the movement of the pen tip 83 and achieve higher printing quality. The pen tip 83 is also provided on its one side with a section 111 for connection to the ink feed tube 81. This structure permits a desirable arrangement where the ink feed tube 81 extends substantially in parallel with the leaf spring 82. This arrangement is effective to increase the frequency response of the leaf spring 82 and minimize the power required to drive the plunger solenoid 93.

Referring to FIG. 32, there is illustrated a modified form of the pen tip 83 where the pen tip is made of synthetic resin as a unit with the leaf spring 82. In this modification, the leaf spring 82 is formed in its bottom surface with a cutout 113 in order to provide a greater resilience to the leaf spring 82.

Referring to FIG. 33, there is illustrated another modification of the pen tip 83 where the pen tip 83 has a turned portion which extends in parallel with the leaf spring 82 and is connected to the ink feed tube 81. The pen tip turned portion is supported by the leaf spring 82.

Figure 34:
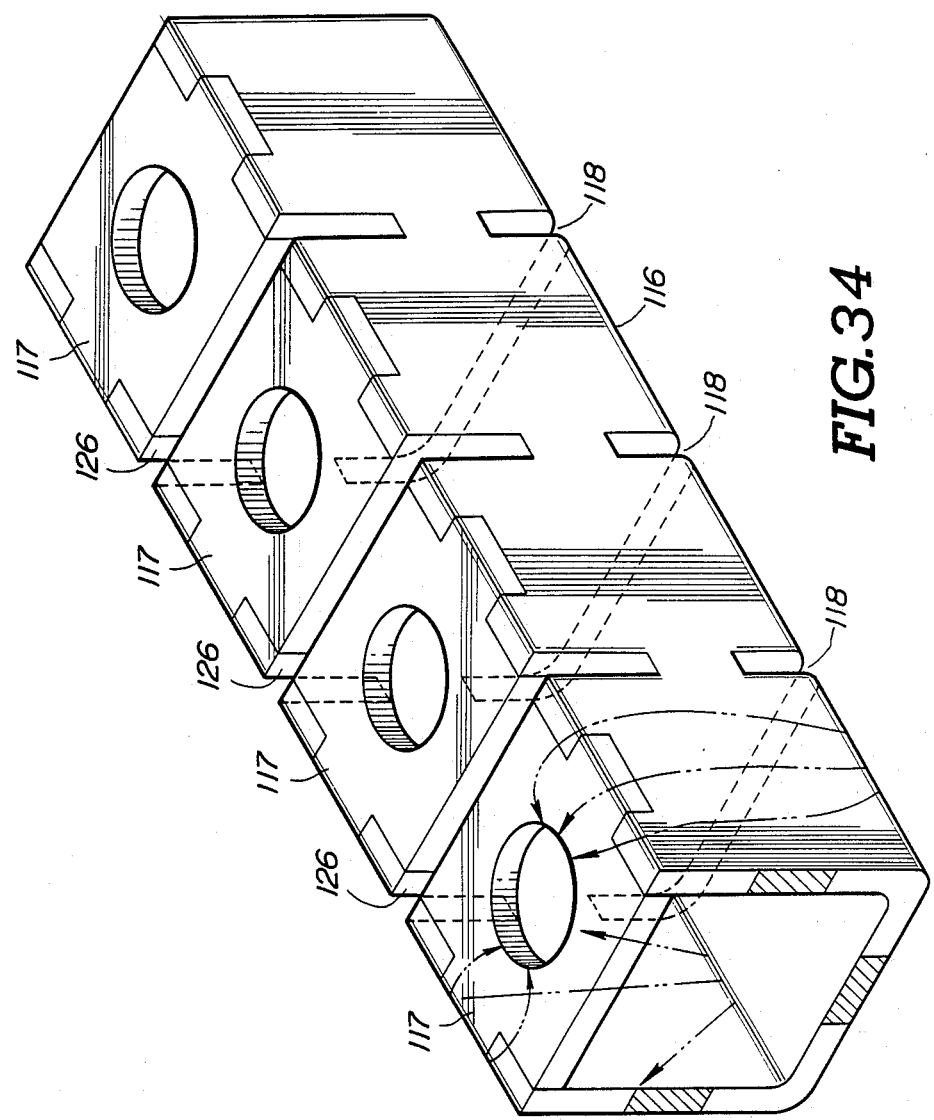
FIG. 34 is a perspective view of the plunger yokes connected in series.
Figure 35:
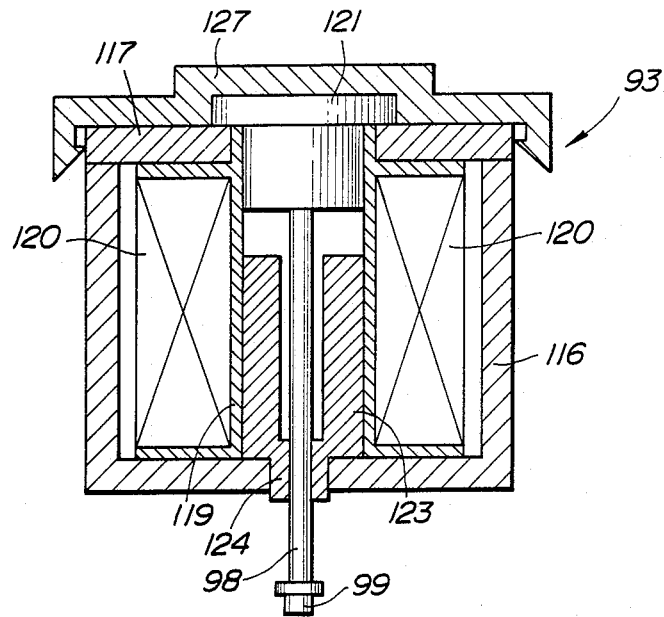
FIG. 35 is a sectional view of the pen actuator.
Figure 36:
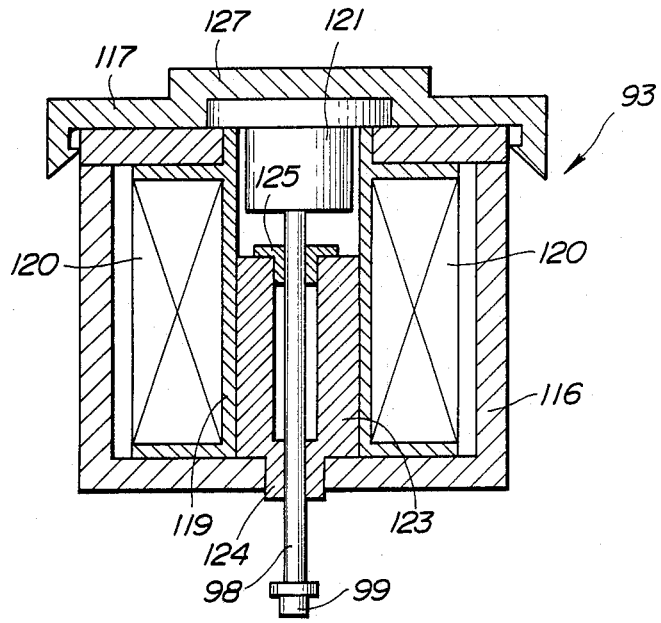
FIG. 36 is a sectional view showing a modified form of the pen actuator.

Referring to FIGS. 34 to 36, the pen actuator unit includes four yokes 116 each contains a solenoid plunger 93 for pushing the corresponding leaf spring 82 to bring the corresponding pen tip 83 into pressure contact with a print paper sheet placed on the platen roller 45 when it is actuated. The four yokes 116 are connected in a line with one another in the direction of movement of the printer head A. Upper and lower slits 126 and 118 are provided between an adjacent pair of the four yokes 116 to avoid magnetic interference therebetween so as to minimize magnetic flux leakage therebetween and increase effective magnetic flux. This structure is effective to create magnetic paths, as indicated by the dotted arrows of FIG. 34, so as to improve the frequency response and reduce the power required to drive the solenoid plungers 93.

Referring to FIG. 35, the pen actuator 93 comprises a bobbin 119 placed in the yoke 116. The bobbin 119 has a solenoid coil 120 wound therearound. An armature 121 is mounted for sliding movement within the bobbin 119. The armature 121 supports a plunger 98 secured thereon for movement within the bobbin 119 with sliding movement of the armature 121. The plunger 98 terminates in a pusher 99. The upper plate 117 is covered with a stopper 127 which constitutes an upper limit of armature movement. An annular plug 123 is fixedly placed in the bobbin 119 so as to constitute a lower limit of armature movement. The plug 123 has a guide 124 at its lower end for guiding the movement of the plunger 98. This structure where the bobbin 119 guides armature movement can minimize the gap between the armature 121 and the bobbin 119, resulting in improved magnetic efficiency and stable frequency response.

When an electrical signal is applied from a pen actuator control circuit to energize the solenoid coil 120, a magnetic flux is created in the solenoid coil to move the plunger 98 downward so as to extrude the plunger 98 toward the ink pen.

Referring to FIG. 36, there is illustrated a modified form of the pen actuator 93 which is substantially the same as the structure of FIG. 35 except for a guide 125 provided at the upper end of the annular plug 123 for guiding the movement of the plunger 98. This modification eliminates the need for the armature 121 being designed to move in sliding contact with the bobbin 121.

Figure 37:
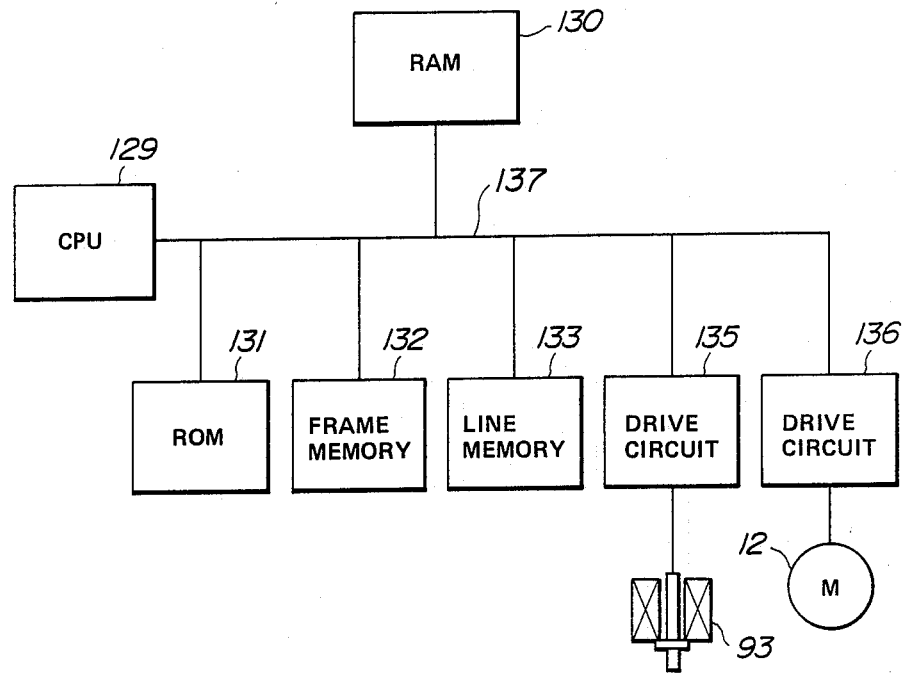
FIG. 37 is a block diagram of the control circuit used in the pen printer.
Figure 39:
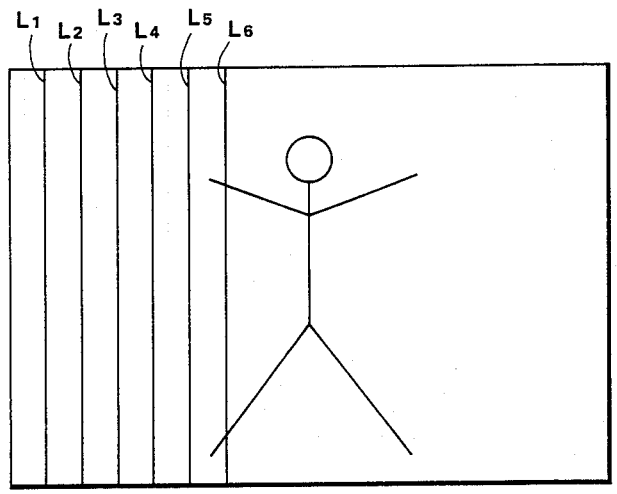
FIG. 39 is a diagram used in explaining the operation of the control circuit.

Referring to FIG. 37, the control circuit employs a digital computer which includes a central processing unit (CPU) 129, a random access memory (RAM) 130, a read only memory (ROM) 131, a frame memory 132, a line memory 133, a pen actuator control circuit 135, and a motor control circuit 136. The CPU 129 communicates with the rest of the computer via data bus 137. The ROM 131 contains the program for operating the central processing unit 129. The RAM 130 stores print information such for example as shown in FIG. 39. The CPU 129 periodically transfers one-frame data of the printing information from the RAM 130 to the frame memory 132. The CPU 129 also periodically transfers one-line data of the printing information from the frame memory 132 to the line memory 133. Control words specifying desired printing operation are periodically transferred by the central processing unit 129 to the pen actuator control circuit 135 for controlling the pen actuators 93 and also to the motor control circuit 136 for controlling the electric motor 12.

Figure 38:
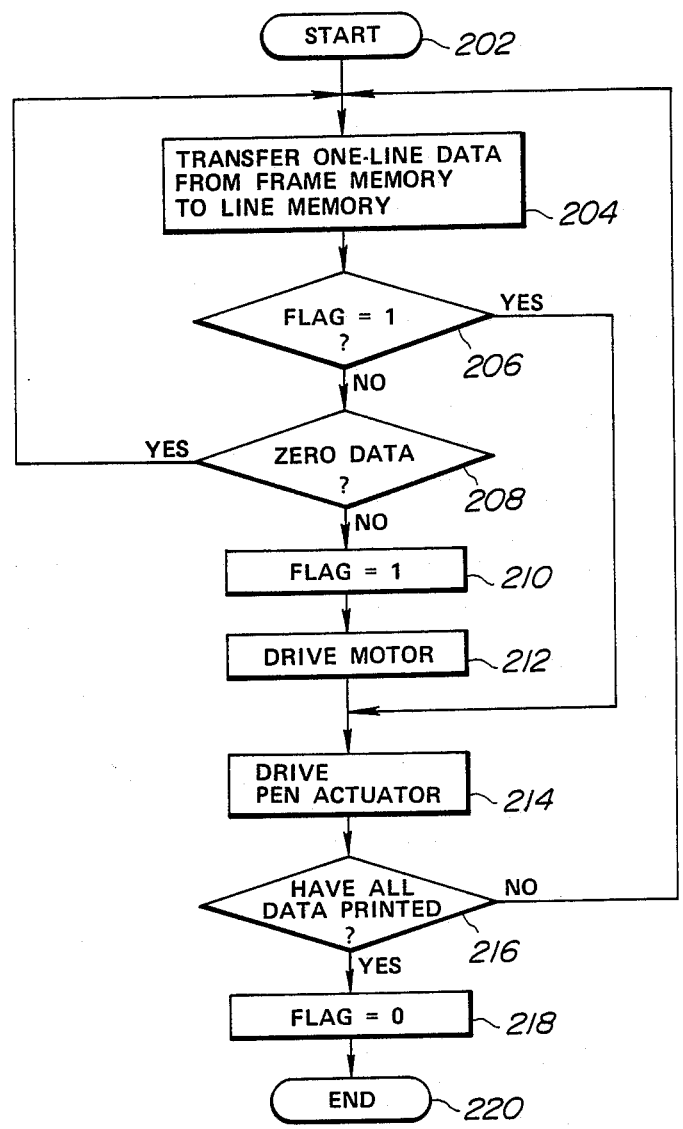
FIG. 38 is a flow diagram illustrating the programming of the digital computer employed in the control circuit.

FIG. 38 is a flow diagram illustrating the programming of the digital computer. The computer program is entered at the step 202. At the step 204 in the program, one-line data are transferred from the frame memory 132 to the line memory 133. At the step 206, a determination is made as to whether or not a flag is set to indicate that the line data transferred in the previous transfer operation is not zero data. If the answer to this question is "no", then the program proceeds to another determination step 208. This determination is as to whether or not the line data transferred in the present transfer operation is zero data. If the answer to this question is "yes", then the program returns to the step 204. This routine is repeated to prevent operation of the electric motor 12 and the pen actuators 93 unitl the line data transferred to the line memory 133 has data.

If the answer to the question checked at the step 208 is "no", then the program proceeds to the step 210 where the flag is set. Following this, the motor control circuit 136 produces a control signal to drive the electric motor 12 at the step 212 and the pen actuator control circuit 135 produces control signals to drive the pen actuators 93 at the step 214. If the answer to the question checked at the step 206 is "yes", then it means that data exists on the line data transferred to the line memory in the previous transfer operation and the program proceeds to the step 214.

At the step 216 in the program, a determination is made as to whether or not all of the line data transferred to the line memory have been printed. If the answer to this question is "no", the program returns to the step 204. Otherwise, the program proceeds to the step 218 where the flag is cleared and then proceeds to the end step 220.

Therefore, the pen printer skips no-image or background area to reduce the time required to print the information by stopping the operation of the carriage 76 and the pen actuators 93 as long as no data exist in the line data transferred to the line memory 133. Assuming now that the print information shown in FIG. 39 is inputted to the RAM 130, the printer will skip the lines L1 to L5. It is to be noted that the background color is not limited to white. If the background color is not white, the control circuit may be arranged to skip the background color.

The operation is as follows: A print paper sheet B is inserted into the path of the print sheet from rear side of the print sheet guide defined by the sheet guide plate 23 and the table 24 after the actuating lever 52 is depressed to rotate the support plate 42 in a direction bringing the platen roller 45 out of the path of movement of the print sheet. This support plate rotation also causes the first resilient members 37 to come out of engagement with the feed rollers 30 and the second resilient members 38 to come out of engagement with the sheet guide plate 23. When the actuating lever 52 is released, the support plate 44 rotates, under the resilient force of the leaf spring 50, in a direction bringing the platen roller 45 into the path of movement of the print sheet. This support plate rotation also causes the first resilient members 37 to come into engagement with the feed rollers 30 so as to allow the feed rollers 30 to feed the print sheet with rotation thereof and the second resilient members 38 into engagement with the sheet guide plate 23 so as to provide back tension on the inserted print sheet. Thereafter, the operator may adjust the top margin of the print sheet by rotating the actuating knob 31.

Thereafter, the control circuit processes the print information inputted and stored in the RAM 130 to start the printing operation. The motor control circuit 136 produces an electrical signal to drive the electric motor 12 and the pen actuator control circuit 135 produces electrical drive signals to drive the pen actuators 93. Rotation of the electric motor 12 is transmitted through the drive gear 14 to the head feed screw 15 to reciprocate the carriage 76 along the platen roller 45. In each of the pen actuators 93, the solenoid coil 120 is energized by the electrical signal to extrude the plunger 98, thereby pushing the associated resilient member 82 so as to bring the pen tip 83 into contact with the print sheet set on the platen roller 45. When the carriage 76 arrives at its rightmost position, it pushes the drive pin 60 to actuate the sheet feed mechanism so as to rotate the roller shaft 28 at a predetermined angle, thereby causing the feed rollers 30 to advance the print sheet a predetermined length on the platen roller and starts moving to the left. When the carriage 76 arrives at its leftmost position, it pushes the drive rod 61 to actuate the sheet feed mechanism so as to rotate the roller shaft 28 at the predetermined angle, thereby causing the feed rollers 30 to advance the print sheet the predetermined length on the platen roller 45.

Upon completion of the printing operation, the print sheet is drawn from the print sheet path after the actuating lever 52 is depressed to rotate the support plate 42 in a direction bringing the platen roller 45 out of the path of movement of the print sheet. This support plate rotation also causes the first resilient members 37 to come out of engagement with the feed rollers 30 and the second resilient members 38 to come out of engagement with the sheet guide plate 23.

When all ink is spent in one of the ink cartridges 78, it is replaced with new one. To replace the cartridge 78 with new one, the actuator lever may be depressed to rotate the lock lever 84 in the counterclockwise direction, as viewed in FIG. 17, against the resilient force of the leaf spring 86 so as to release the engagement of the hook 89 with the shoulder 91. This operation permits the leaf spring 92 to push the ink cartridge 78 to the right, as viewed in FIG. 17. After the removal of the old ink cartridge 78 from the carriage 76, the lock lever 84 returns to its initial lock position under the resilient force of the leaf spring 85.

Figure 17:
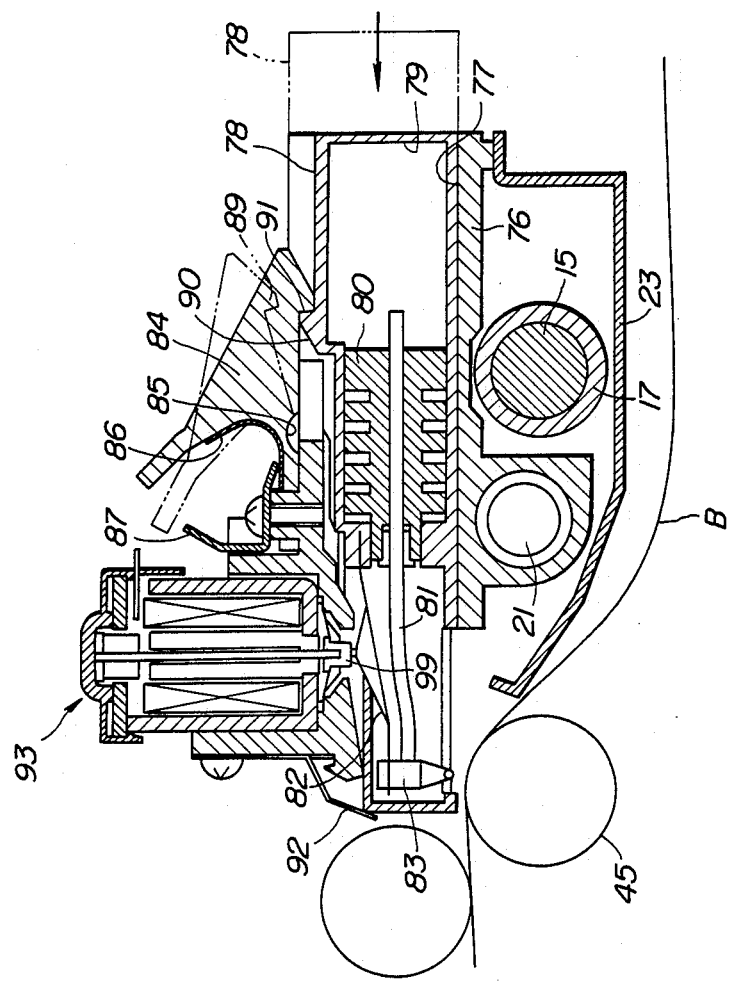
FIG. 17 is a sectional view of the printer head.
Figure 18:
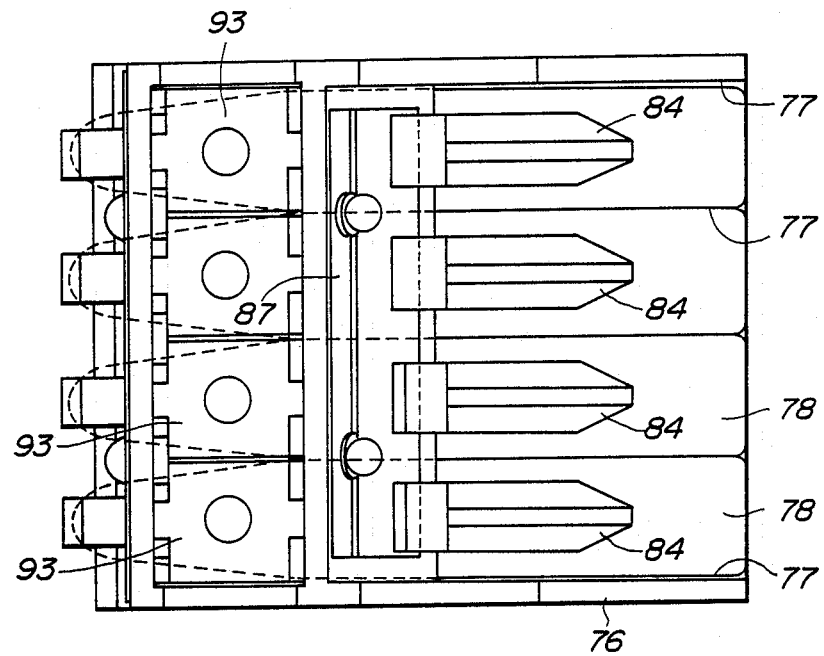
FIG. 18 is a plan view of the printer head.
Figure 19:
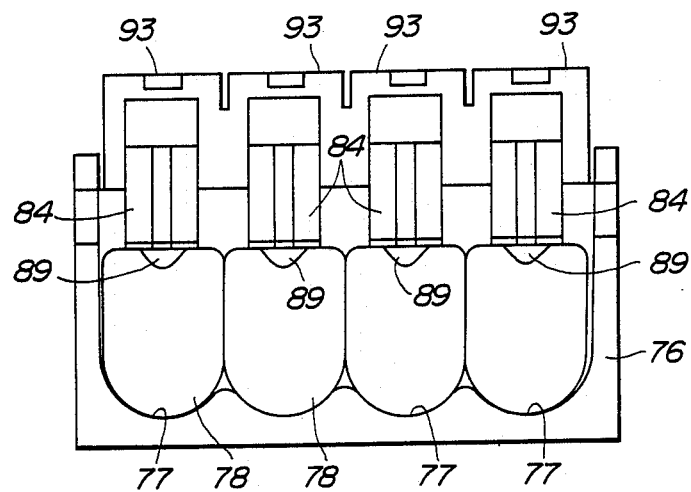
FIG. 19 is a rear view of the printer head.
Figure 20:
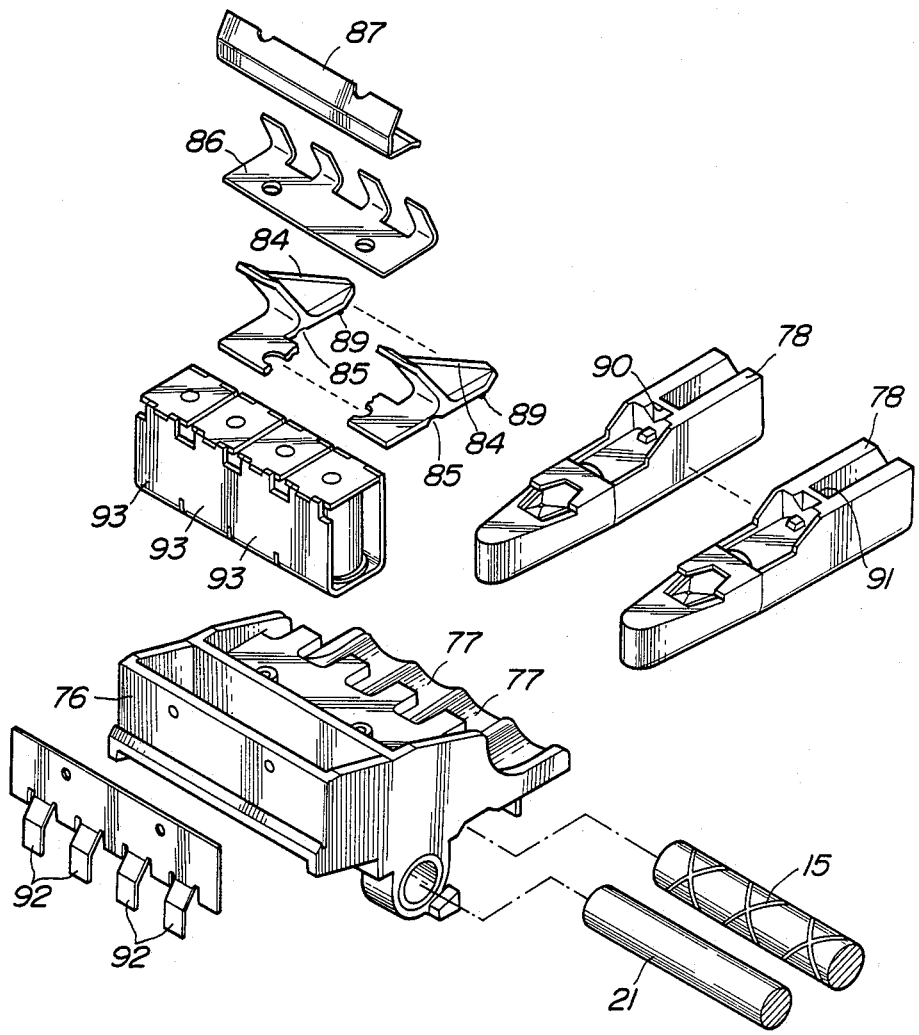
FIG. 20 is an exploded perspective view of the printer head.
Figure 21:
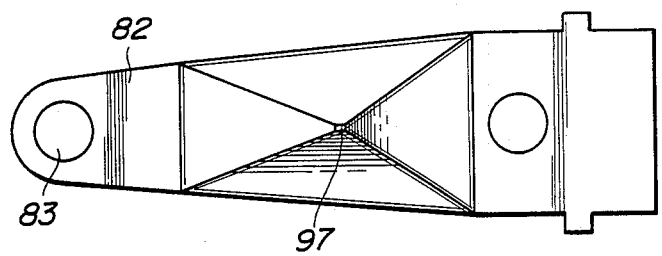
FIG. 21 is a plan view of the leaf spring supporting the pen tip.
Figure 22:
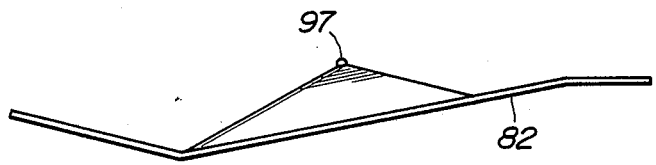
FIG. 22 is a side view of the leaf spring.
Figure 23:
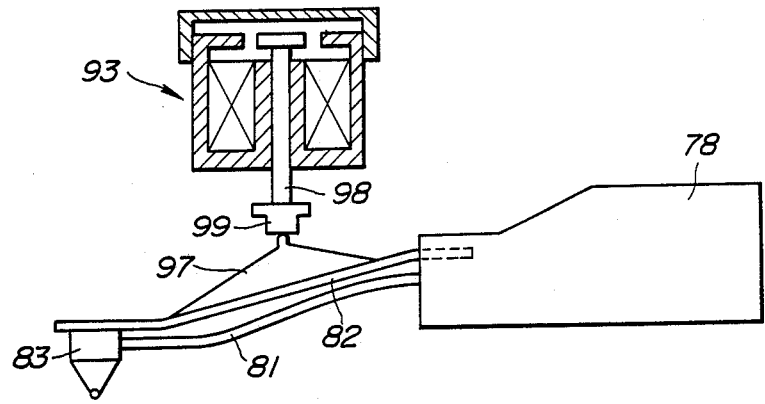
FIG. 23 is a side view partly in section showing the pen actuator with its plunger being in abutment on the leaf spring.
Figure 24:
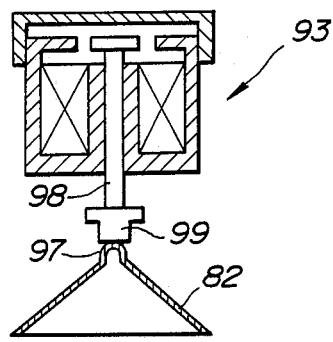
FIG. 24 is a sectional view showing the pen actuator with its plunger being in abutment on the leaf spring.

A new ink cartridge 78 is inserted while sliding on the corresponding cartridge attachment section or guide slot 77 in a direction indicated by the arrow of FIG. 17. In the course of insertion of the new ink cartridge 78, the lock lever hook 89 rids over the inclined surface 90 and comes into engagement with the ink cartridge shoulder 91. A stopper (not shown) is provided for preventing further insertion of the cartridge 78 over a predetermined position. The leaf spring 92 holds the ink cartridge 78 with its shoulder being in engagement with the lock lever hook 89. This structure permits removal or attachment of an ink cartridge through a single operation. In addition, it is possible to replace each of the ink cartridges with new one away from the other cartridges. Furthermore, the ink cartridge 78 can be replaced with new one away from the corresponding pen actuator 93.

While this invention has been described in conjunction with a specific embodiment thereof, it is evident that many alternatives, modifications and variations will be apparent to those skilled in the art. Accordingly, it is intended to embrace all alternatives, modifications and variations that fall within the scope of the appended claims.

What is claimed is:

1. A pen printer for converting data into printed form on a print sheet placed on a platen, comprising:

means, including a plurality of ink pens movable into direct contact with said print sheet, for printing information on said print sheet in different colors;

a pen carriage mounted for reciprocating movement above said platen, said pen carriage having means for removably attaching each of said ink pens juxtaposed in the direction of movement of said pen carriage, said pen carriage has a plurality of cartridge guide slots for receiving said respective ink pens thereon, lock members rotatably mounted on said pen carriage, each of said lock members having a hook resiliently urged for engagement with corresponding one of said ink pens, and resilient means for urging said ink pens to hold the same in engagement with said hooks, respectively;

pen actuators mounted on said pen carriage apart from said ink pens, said pen actuators being free from attachment to said ink pens, and each pen actuator being responsive to an electrical signal for bringing a corresponding one of said ink pens toward said platen into contact with said print sheet;

a carriage actuator responsive to an electrical signal for moving said pen carriage;

a sheet feed mechanism responsive to arrival of said pen carriage to at least one of first and second predetermined positions separated from each other for feeding said print sheet a predetermined length on said platen; and a control circuit for converting said data into electrical signals to control said pen actuators and said carriage actuator.

2. The pen printer as claimed in claim 1, wherein each of said ink pens includes a pen cartridge containing an ink tank, a pen tip, and an ink feed tube connected between said ink tank and said pen tip, and a resilient member secured at its one end on said pen cartridge, said resilient member supporting said pen tip secured on the other end thereof, the ink tanks of said ink pens containing inks of different colors.

3. The pen printer as claimed in claim 2, wherein each of said pen actuators includes a plunger and a solenoid responsive to said electrical signal for extruding said plunger to push said resilient member so as to bring said pen tip into contact with said print sheet on said platen.

4. The pen printer as claimed in claim 3, wherein said resilient member is provided at its center with a projection for abutment with said plunger.

5. The pen printer as claimed in claim 1, wherein said carriage actuator includes means for reciprocating said carrier at a predetermined speed.

6. The pen printer as claimed in claim 5, wherein said sheet feed mechanism includes means for feeding said print sheet a predetermined length on said platen in response to arrival of said carriage at each of said first and second predetermined positions.

7. The pen printer as claimed in claim 1, which includes means for manually moving said platen downward to open a path for said print sheet.

8. The pen printer as claimed in claim 1, wherein said printing information means includes a plurality of ink tanks respectively associated with said plurality of ink pens, wherein the ink tanks respectively contain inks of different colors.

* * * * *